(12) United States Patent
Stengele et al.

(10) Patent No.: US 6,652,204 B2
(45) Date of Patent: Nov. 25, 2003

(54) MACHINE TOOL

(75) Inventors: Gerald Stengele, Ludwigsburg (DE); Dietrich Geiger, Grossbottwa (DE)

(73) Assignee: Hüller Hille GmbH, Ludwigsburg (DE)

( * ) Notice: Subject to any disclaimer, the term of this patent is extended or adjusted under 35 U.S.C. 154(b) by 99 days.

(21) Appl. No.: 10/092,978

(22) Filed: Mar. 7, 2002

(65) Prior Publication Data

US 2002/0127072 A1 Sep. 12, 2002

(30) Foreign Application Priority Data

Mar. 9, 2001 (EP) .............................................. 01105919

(51) Int. Cl.⁷ .............................................. B23C 1/027
(52) U.S. Cl. ...................... 409/235; 409/191; 310/13; 408/234
(58) Field of Search ................................ 409/235, 191, 409/190, 202, 212; 408/234; 310/12–14

(56) References Cited

U.S. PATENT DOCUMENTS

| | | | | |
|---|---|---|---|---|
| 4,834,353 A | * | 5/1989 | Chitayat | 310/13 |
| 5,346,345 A | * | 9/1994 | Jerzycke et al. | 409/235 |
| 5,368,425 A | * | 11/1994 | Mills et al. | 409/235 |
| 5,368,539 A | * | 11/1994 | Mills et al. | 483/1 |
| 5,688,084 A | | 11/1997 | Fritz et al. | |
| 5,789,892 A | | 8/1998 | Takei | |
| 6,012,884 A | | 1/2000 | Azema | |
| 6,161,995 A | | 12/2000 | Wakazono et al. | |
| 6,281,644 B1 | * | 8/2001 | Komatsu et al. | 310/12 |
| 6,439,813 B1 | * | 8/2002 | Repossini | 409/235 |
| 2002/0131836 A1 | * | 9/2002 | Ferrari et al. | 409/212 |
| 2003/0034696 A1 | * | 2/2003 | Bundschu et al. | 310/12 |

FOREIGN PATENT DOCUMENTS

| | | |
|---|---|---|
| DE | 30 37 648 | 4/1981 |
| DE | 19507989 A1 * | 9/1996 |
| DE | 0 893 196 A2 | 1/1999 |
| DE | 0 742 072 | 4/2000 |
| EP | 0816012 A1 * | 1/1998 |

OTHER PUBLICATIONS

NN920717, "Printed Circuit Board Drilling Machine with Linear Motor Spindle Positioning", IBM Technical Disclosure Bulletin, Jul. 1992, vol. 35, Issue 2, pp. 17–18.*

* cited by examiner

Primary Examiner—A. L. Wellington
Assistant Examiner—Erica Cadugan
(74) Attorney, Agent, or Firm—McGlew and Tuttle, P.C.

(57) ABSTRACT

A machine tool comprises a rack, a horizontally displaceable x skid and a y skid that is vertically displaceable thereon. The skids are drivable by linear motors which are arranged on the front side of the rack and the face side of the x skid, respectively, and on the rear side of the x skid and the rear side of the y skid, respectively. The same may apply to the x guides and the y guides. The air gaps of the linear motors of each skid are arranged in one plane.

11 Claims, 10 Drawing Sheets

MACHINE TOOL

BACKGROUND OF THE INVENTION

1. Field of the Invention

The present invention is related to a machine tool.

2. Background Art

A machine tool comprising a frame-like machine rack in which an x skid runs horizontally displaceable on guides is known from EP 0 742 072. Inside the x skid, another y skid runs vertically displaceable on guides. For actuation, x linear motors and y linear motors are provided which are arranged with their sides facing each other so that the forces of the x linear motors acting in y direction and the forces of the y linear motors acting in x direction cancel each other out, providing a symmetry of forces. The same applies to the drives of a z skid which carries a tool spindle and which rests on the y skid. This so-called box-in-box construction is widely used because of the compact and rigid framework construction and the symmetry of forces. As a disadvantage, the working of the skids and the assembly and, if necessary, maintenance work are complicated due to the difficult accessibility of the guides and linear motors. Because of the symmetry of forces, the guides are essentially not biased so that the wear of the guides causes a backlash of the guides, which affects the processing quality.

A similar embodiment is known from U.S. Pat. No. 5,688,084 A.

U.S. Pat. No. 6,012,884 A describes a machine tool comprising a frame-like rack with an x skid provided thereon which is horizontally displaceable in the x direction and on which a y skid is vertically displaceable in the y direction. Inside the y skid, a z skid is arranged, carrying a tool spindle. An x linear motor arranged in the region of a lower x guide is provided to drive the x skid. Two y linear motors facing each other symmetrically and acting by force balance are provided to drive the y skid.

SUMMARY OF THE INVENTION

It is an object of the present invention to embody a machine tool which comprises an x skid and a y skid displaceably arranged thereon, with the latter carrying a tool spindle, and the skids of which can be manufactured at a low manufacturing expense and then easily be assembled, and which are free of any guide backlash irrespective of the wear of the guides.

According to the present invention, this object is achieved in a machine tool comprising a frame-like rack defining an inner space, and having a front side positioned in an x-y plane; an x skid having a- rear side facing the front side, and a face side turned away from the rear side and assigned to an operating side; x guides mounted on the rack on the one hand, and on the x skid on the other, and allowing a displacement of the x skid relative to the rack in x direction; y guides mounted on the x skid on the one hand, and on the y skid on the other, and allowing a displacement of the y skid relative to the x skid in y direction; a tool spindle arranged in the y skid and extending in z direction; x linear motors arranged on the front side of the rack on the one hand and on the rear side of the x skid on the other, each comprising a primary part and a secondary part, and each comprising an air gap between the primary part and the secondary part, wherein the air gaps of the x linear motors are arranged in a common x-y plane; and y linear motors arranged on the face side of the x skid on the one hand and on the rear side of the y skid on the other, each comprising a primary part and a secondary part, and each comprising an air gap between the primary part and the secondary part, wherein the air gaps of the y linear motors are arranged in a common x-y plane. Due to the design according to the present invention, manufacturing the rack and the x skid and the y skid in the vicinity of the respective linear motors is very simple, as only freely accessible front sides have to be worked. Also, the assembly is very simple, as the assembly surfaces are freely accessible. Further, the specific arrangement of the linear motors ensures that the forces of attraction that act in linear motors transversely to the direction of motion act only in the z direction, thus compensating for any guide backlash in the guides. Even when a backlash occurs due to wear of the guides, the guides can normally still be used while they have to be replaced in the conventional construction of the prior art.

The characteristics which consist in that the x guides are attached to the front side of the rack on the one hand and to the rear side of the x skid on the other, and in that the y guides are attached to the face side of the x skid on the one hand and to the rear side of the y skid on the other, ensure that also the assembly surfaces of the guides can be worked very easily and the guides themselves can be assembled with little expense. Further, each individual guide is loaded symmetrically in this construction.

When a first part of each x linear motor is arranged on the front side of the rack and a second part is arranged on the rear side of the x skid; when a first part of each y linear motor is arranged on the face side of the x skid and a second part is arranged on the rear side of the y skid; when the x guides are mounted on the rack and the x skid, respectively, by screws that extend in z direction; and when the y guides are mounted on the x skid and the y skid, respectively, by screws that extend in z direction; this defines how the individual parts of the linear motors and the guides are assigned to each other in an especially simple way.

An embodiment which enhances the assembly and the ease of processing resides in that the x linear motors are mounted on the rack and the x skid, respectively, by screws that extend in z direction; and in that the y linear motors are mounted on the x skid and the y skid, respectively, by screws that extend in z direction.

When the x linear motors are arranged mirror-symmetrically relative to a central x-z plane of the rack; and when the y linear motors are arranged mirror-symmetrically relative to a central y-z plane of the x skid; this defines optimum arrangements of the linear motors.

When the guides and the linear motors are at least in part openly exposed towards the operating side, large portions of the guides and the linear motors are accessible directly from the operating side, requiring only a displacement of the x skid and/or the y skid to an outermost position.

Further characteristics, advantages and details of the invention will become clear from the following description of an exemplary embodiment with reference to the drawings.

DESCRIPTION OF THE PREFERRED EMBODIMENT

Figure 1:
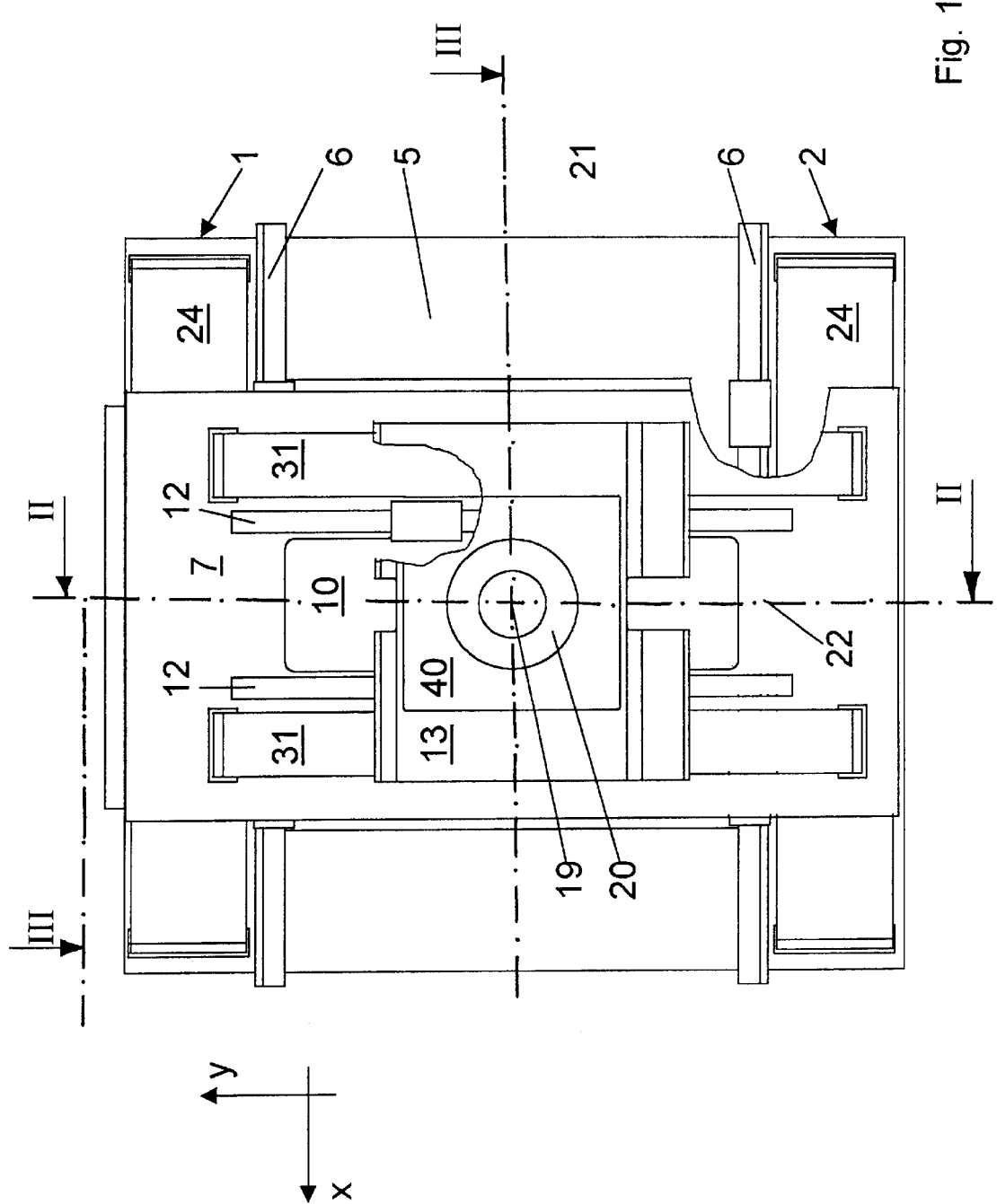
FIG. 1 is a partial elevation of a machine tool according to the invention comprising a tool spindle which is non-displaceable in the z direction.
Figure 2:
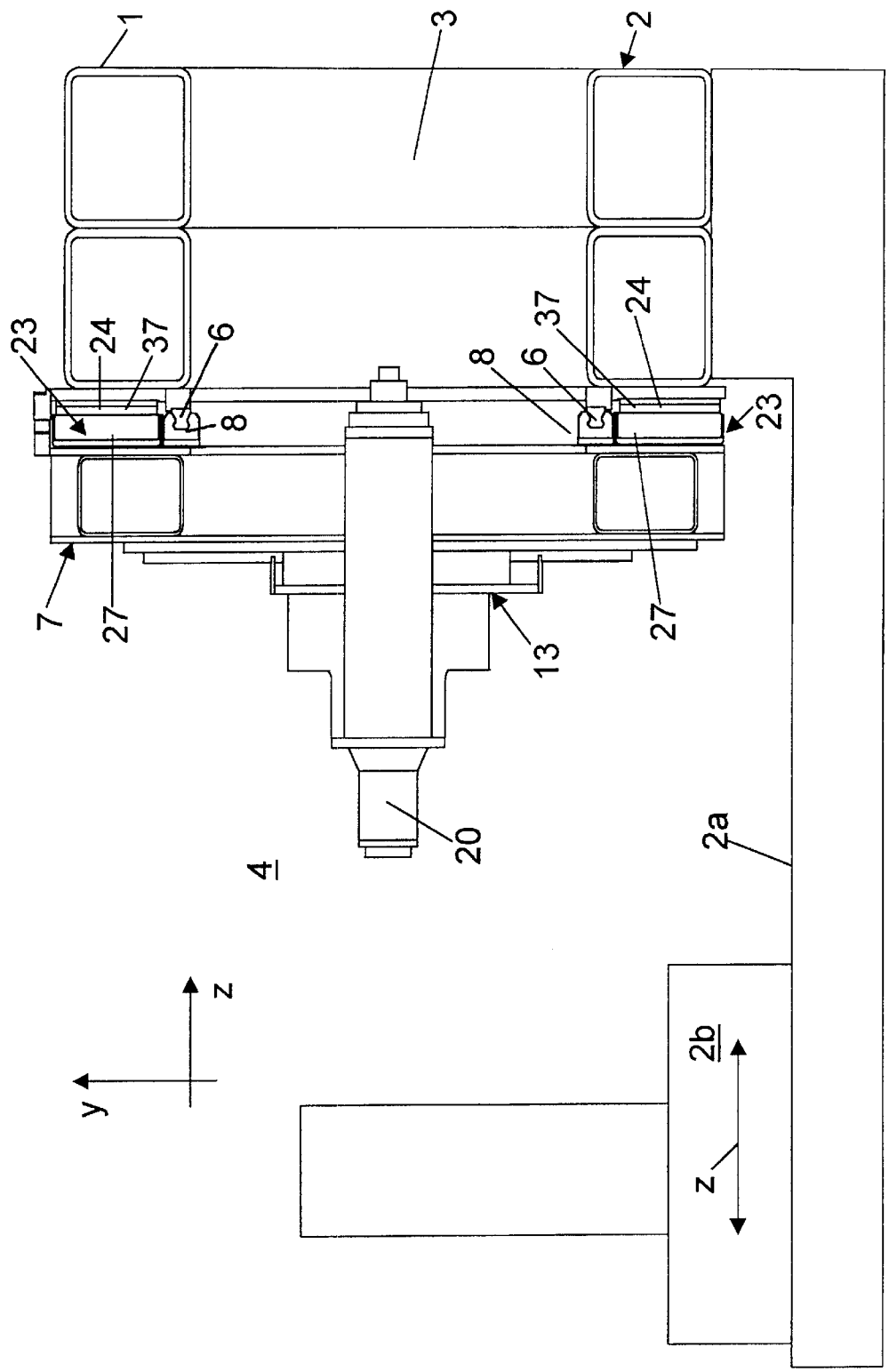
FIG. 2 is a vertical longitudinal section through the machine tool of FIG. 1 along the line II—II in FIG. 1.
Figure 3:
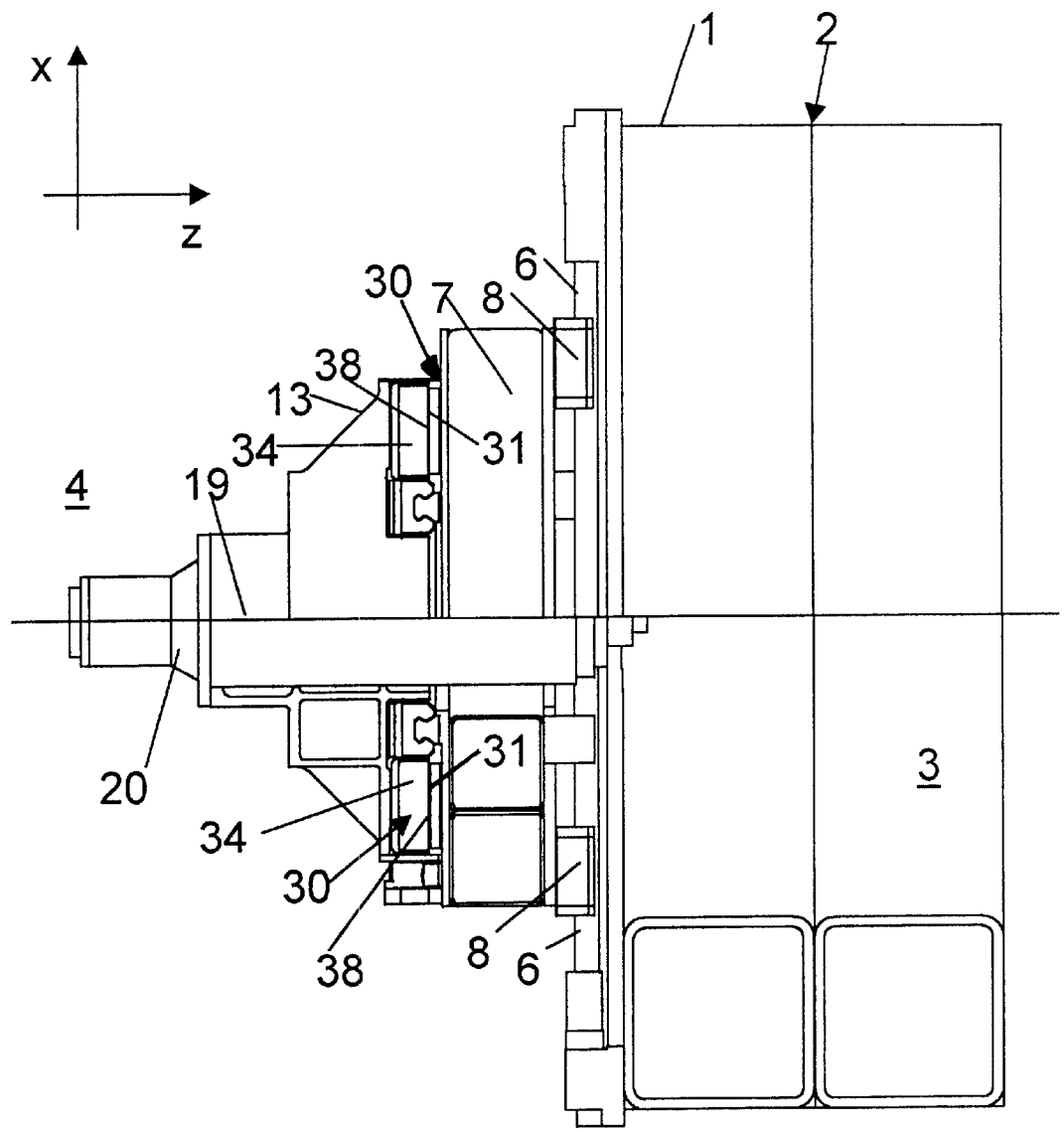
FIG. 3 is a horizontal longitudinal section through the machine tool of FIG. 1 along the line III—III in FIG. 1.
Figure 4:
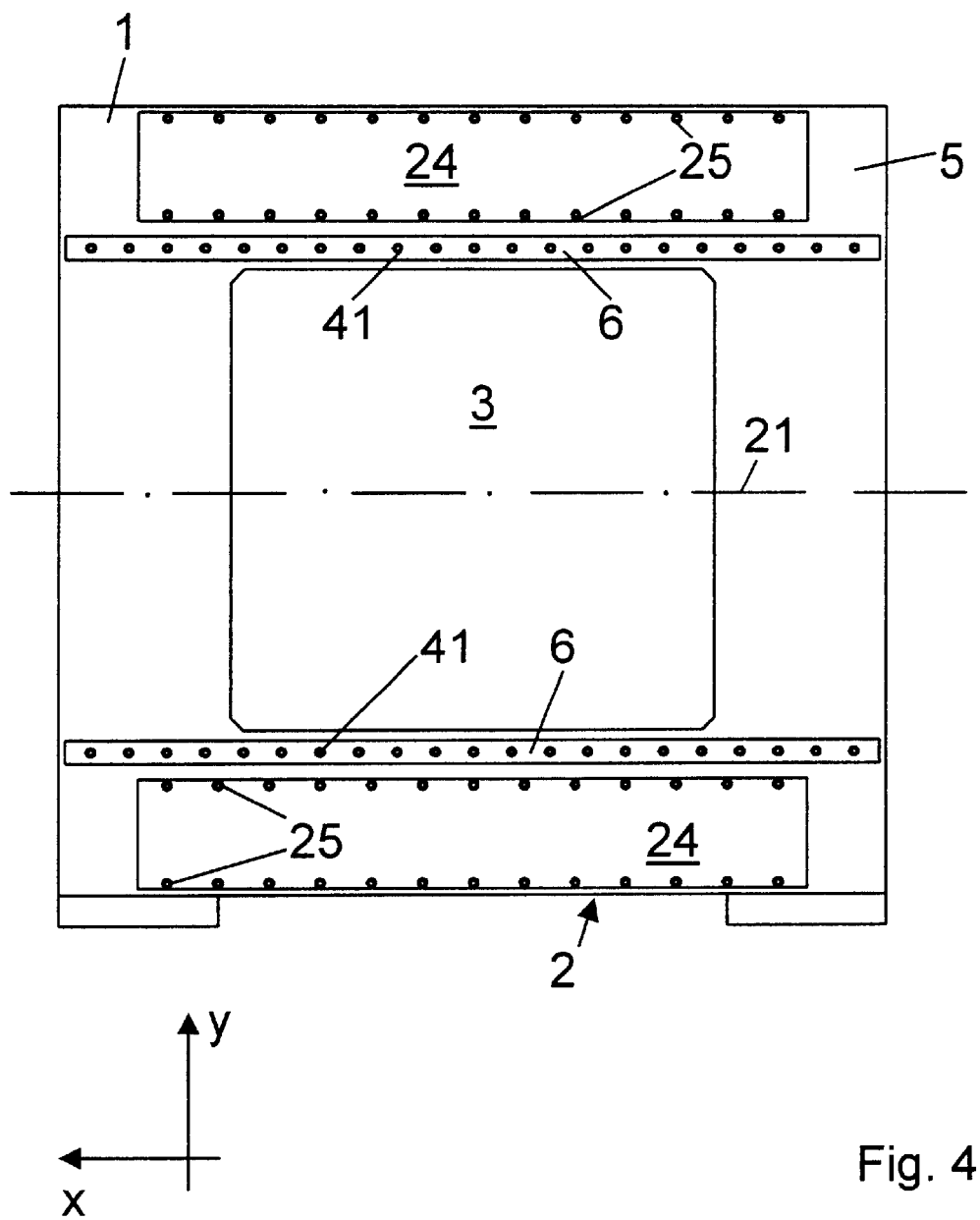
FIG. 4 is an elevation of the rack of the machine tool.
Figure 5:
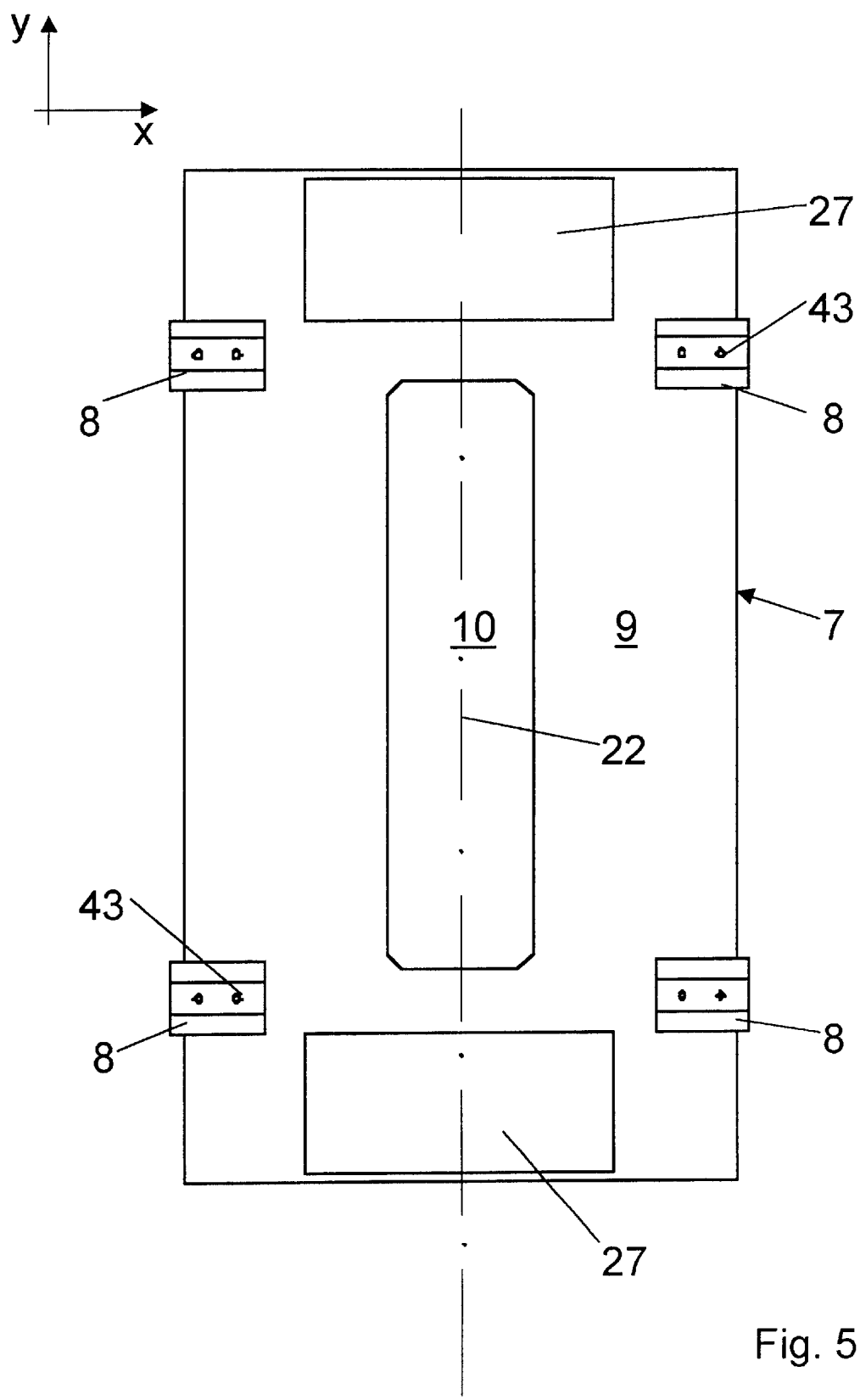
FIG. 5 is a plan view of the rear side of the x skid.

As can be seen especially clearly in FIGS. 1 through 3, the machine tool illustrated in the drawing comprises a rack 2 formed as a frame 1 of approximately square shape when viewed in the horizontal z direction. The rack 2 is supported by a base frame 2a. As can be seen in FIGS. 2 and 3, the frame 1 consists of hollow sections and encloses an inner space 3 which is open to both sides, especially towards the operating side 4. On the operating side 4, a work piece carrier 2b is supported by the base frame 2a, which carrier may be displaceable in z direction in the usual manner.

On the front side 5 of the rack 2 facing the operating side 4, a guide rail 6 is mounted on each side of the inner space 3 in a vertical x-y plane and extending in x direction, respectively, with the guide rails 6 being arranged parallel to each other. An x skid 7 having guide shoes 8 and being horizontally displaceable in x direction rests on the guide rails 6. The guide shoes 8 are attached to the rear side 9 of the x skid 7 that face the front side 5 of the rack 2. The x skid 7 is also shaped as a frame and comprises a passage aperture 10 open in z direction and essentially extending vertically in y direction. On its face side 11 facing the operating side 4, y guide rails 12 are arranged on both sides of the passage aperture 10 parallel to each other and extending in y direction, on which a y skid 13 rests by means of guide shoes 14 so as to be vertically displaceable, i.e. in y direction. The guide shoes 14 are attached to the rear side 15 of the y skid 13 that is turned toward the face side 11 of the x skid 7.

Figure 9:
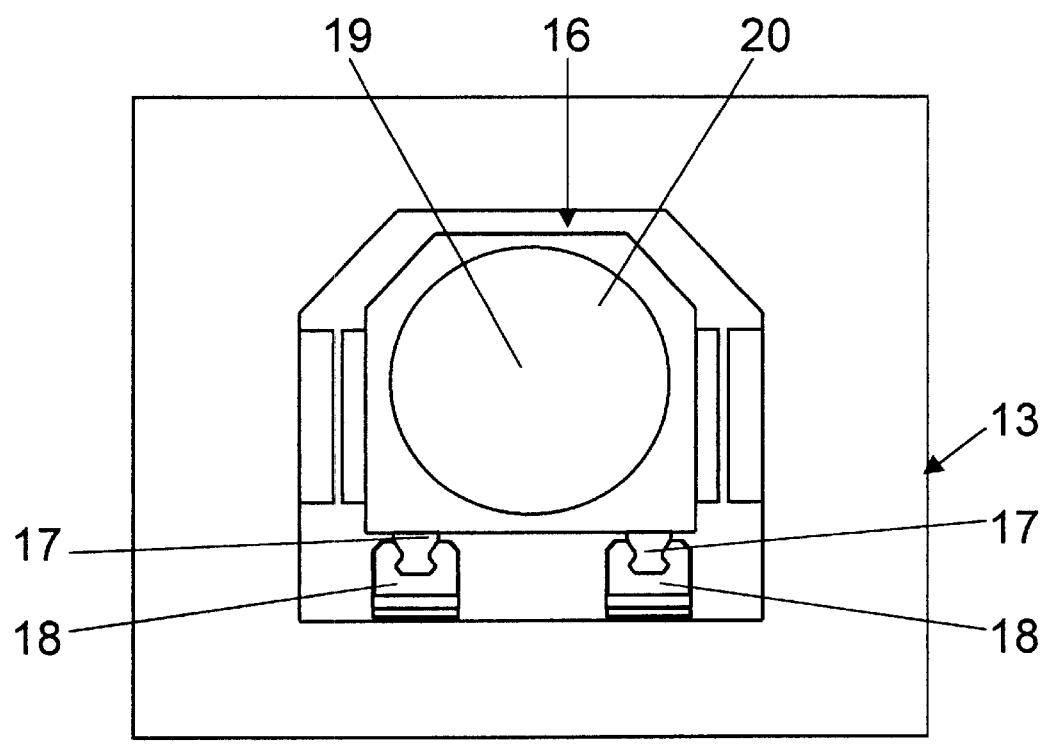
FIG. 9 a view of the y skid provided with a z skid.

In the design according to FIG. 9, a z skid 16 is arranged in the frame-like y skid 13 that is continuously open in z direction, the z skid 16 resting on a pair of parallel z guide rails 17 extending in z direction so as to be displaceable in z direction by means of guide shoes 18 attached to the y skid 13. The z skid 16 carries a tool spindle 20 capable of being rotationally driven around an axis 19 extending in z direction. In contrast, the design according to FIGS. 1 through 3 comprises a tool spindle 20 in a nondisplaceable manner. In such a design, the work piece carrier 2b is formed in the usual way, being movable in z direction towards the tool spindle 20.

The x guide rails 6 together with guide shoes 8 form x guides that are arranged in a mirror-symmetrical way relative to the x-z central plane 21 of the rack 2. The y guide rails 12 together with guide shoes 14 form y guides that are arranged in a mirror-symmetrical way relative to the y-z central plane 22 of the x skid 7.

Provided between the front side 5 of the rack 2 and the rear side 9 of the x skid 7 are x linear motors 23. They are also arranged in a mirror-symmetrical way relative to the central x-z plane in the x-y plane. They comprise permanent magnet arrangements 24 as a secondary part, which extend along the entire operating path of the x skid 7. A permanent magnet arrangement 24 is fastened to the front side 5 of the rack 2 on each side of the adjacent guide rail 6 that faces away from the inner space 3, respectively. The mounting is performed by screws 25 which are screwed into threaded holes 26 in the rack 2 and open towards the front side 5. The screws 25 are screwed from the side that is open towards the operating side 4 through the permanent magnet arrangement 24 into the threaded holes 26. All screws 25 extend in z direction.

Figure 10:
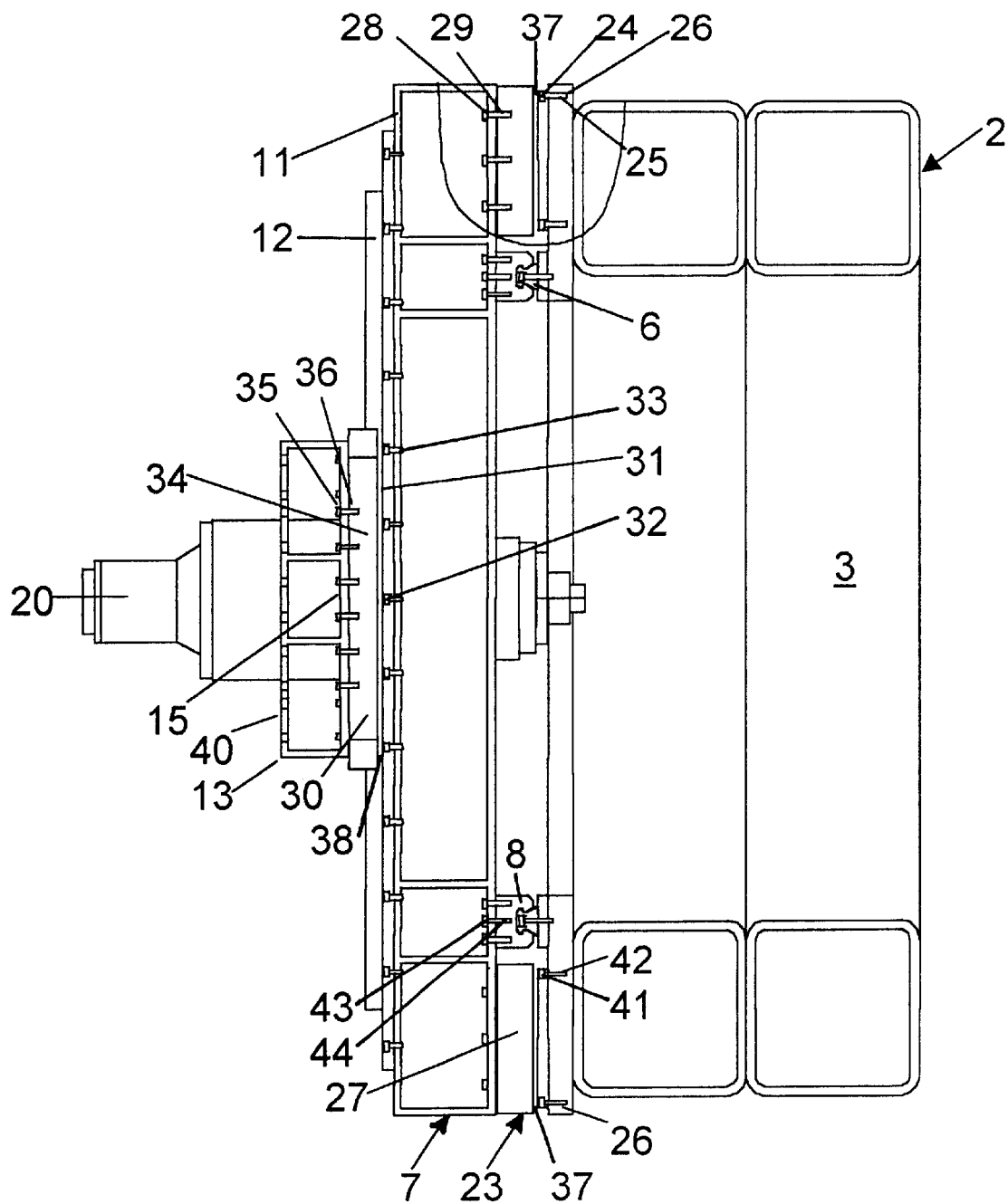
FIG. 10 is a schematic view illustrating the arrangement of the linear motors and guides between the rack and the skids in a vertical longitudinal section.

Assigned to each permanent magnet arrangement 24 is a stator coil 27 as primary part mounted on the rear side of the x skid 7 by means of screws 28 which are screwed in threaded holes 29 provided in the stator coils 27. The screws 28 also extend in the z direction. They are screwed from the face side 11 of the x skid 7 into the threaded holes 29 of the stator coils 27 as illustrated in FIG. 10. Due to the forces of attraction acting in the x linear motors 23 also in z direction, the guide shoes 8 are pressed against the respective guide rail 6 so that any backlash in the x guides is eliminated.

Figure 6:
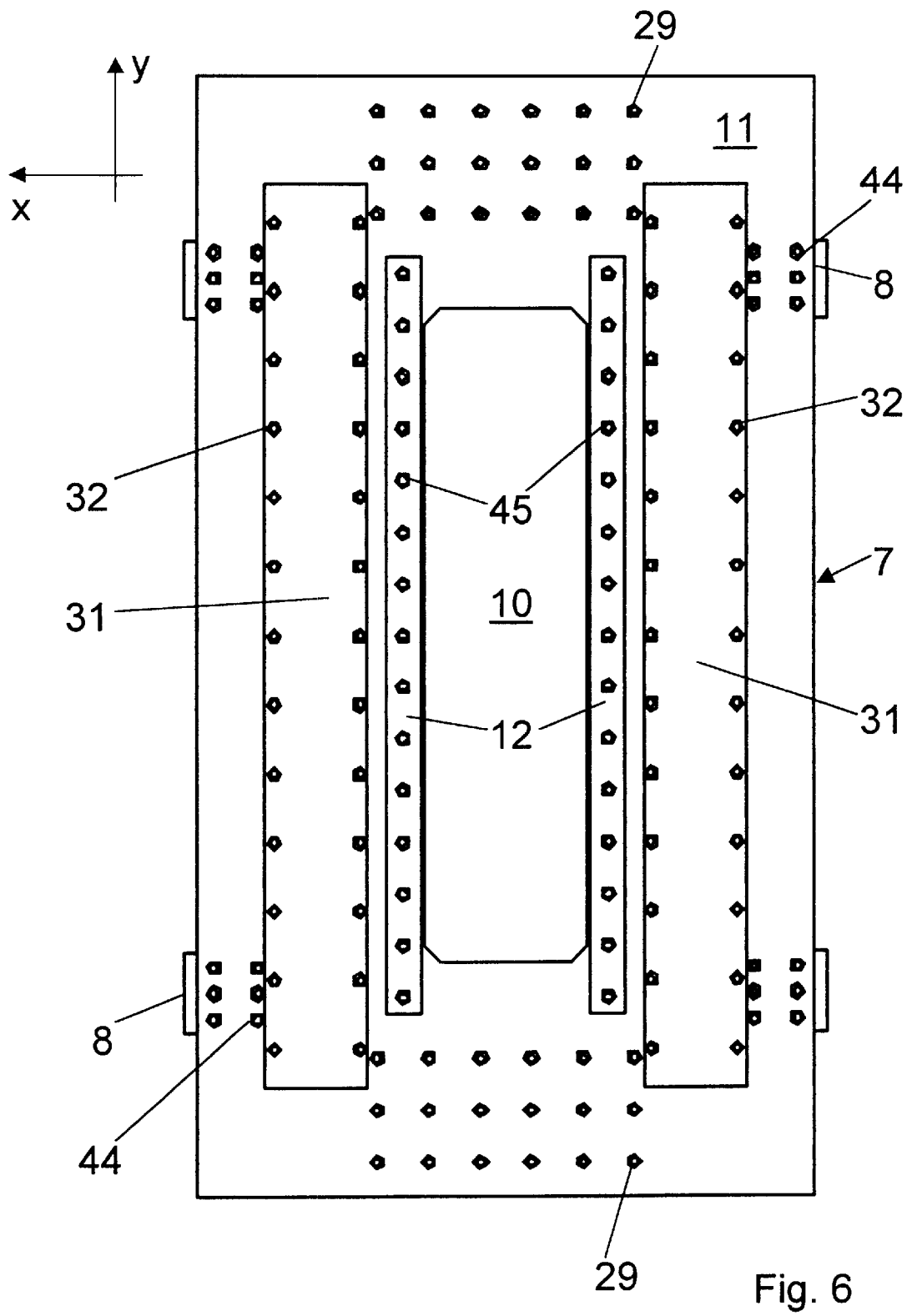
FIG. 6 is a plan view of the front side of the x skid.
Figure 7:
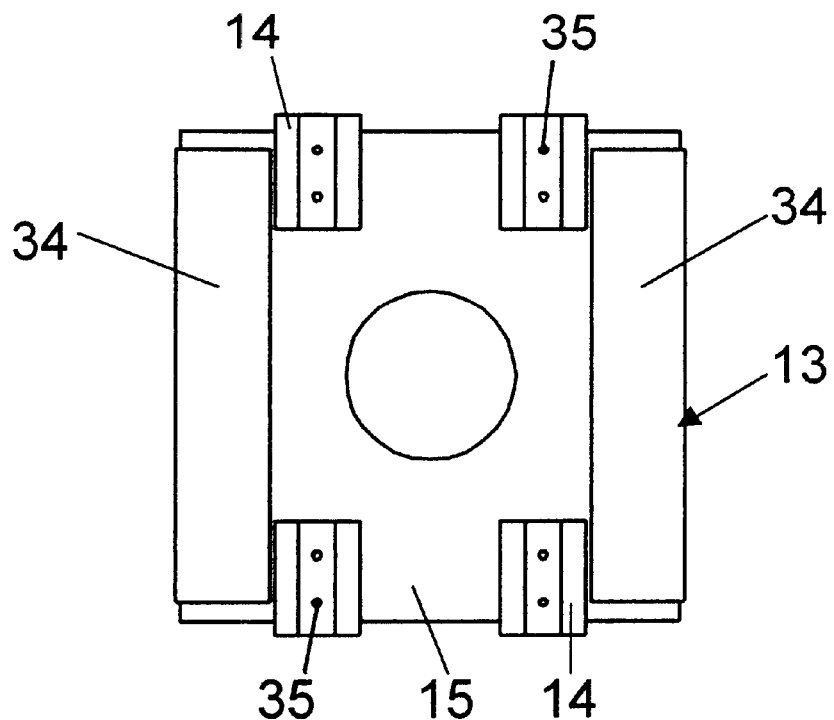
FIG. 7 is a plan view of the rear side of the y skid.
Figure 8:
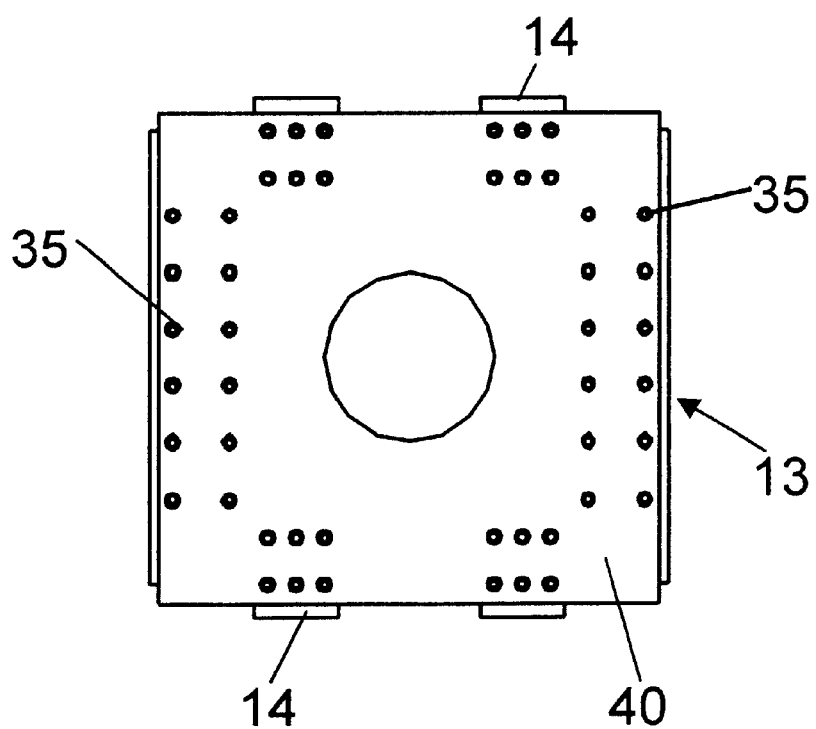
FIG. 8 is a plan view of the front side of the y skid.

Arranged between the face side II of the x skid 7 and the rear side 15 of the y skid 13 are y linear motors 30. They comprise permanent magnet arrangements 31 as a secondary part mounted on both sides of the guide rails 12 on the face side 11 of the x skid 7 and extending along the complete displacement path of the y skid 13. They are arranged adjacent to the guide rail 12 on the side facing away from the passage aperture 10, respectively. They are also mounted on the x skid 7 by screws 32 which are screwed through the permanent magnet arrangement 31 into threaded holes 33 open towards the face side 11 in the x skid 7 as illustrated in FIGS. 6 and 10. Assigned to each permanent magnet arrangement 31 is a stator coil 34 as a primary part mounted on the rear side 15 of the y skid 13 by screws 35. The screws 35 are screwed from the front side 40 of the y skid 13 into threaded holes 36 of the stator coil 34. In this case, too, the forces acting in the y linear motors 30 in the z direction ensure that the guide shoes 14 of the y skid 13 are pressed against the guide rails 12 on the x skid 7 so as to eliminate any backlash in the y guides by the y linear motors 30.

As becomes clear from the above explanation, the air gaps 37 of the x linear motors 23 are arranged between the permanent magnet arrangements 24 thereof and the stator coils 27 essentially in a common x-y plane. Likewise, the air gaps 38 of the y linear motors 30, i.e. the air gaps 38 between the permanent magnet arrangements 31 and the stator coils 34, are in an x-y plane which is offset in the z direction from the x-y plane of the air gaps 37.

In the displaceable design of y skid 13 shown in FIG. 9, z linear motors 39 are provided for driving the z skid 16 in z direction.

The linear motors described above are synchronous linear motors. Asynchronous linear motors may be used as well, in which the primary part is a stator coil while the secondary part consists of sheet metal packages provided with short-circuit coils.

Regarding the mounting of the guide rails 6 and 12 and the guide shoes 8 and 14, the same applies as to the mounting of the linear motors 23 and 30. The x guide rails 6 are mounted by means of screws 41 in threaded holes 42 provided in the front side 5 of the rack 2. Screwing is performed in the same direction and manner as in the permanent magnet arrangement 24. The guide shoes 8 are mounted by screws 43 in threaded holes 44 provided in the x skid 7, with the screwing being performed in the same way as with the stator coils 27. The y guide rails 12 are mounted by screwing screws 45 into threaded holes (not shown) in the front side 11 of the x skid 7, with the screwing being performed in the same way as with the permanent magnet arrangements 31. Finally, the guide shoes 14 are mounted by screwing screws 46 into threaded holes (not shown) in the rear side 15 of the y skid 13, with the screwing being performed in the same way as with the stator coils 34.

Figure 11:
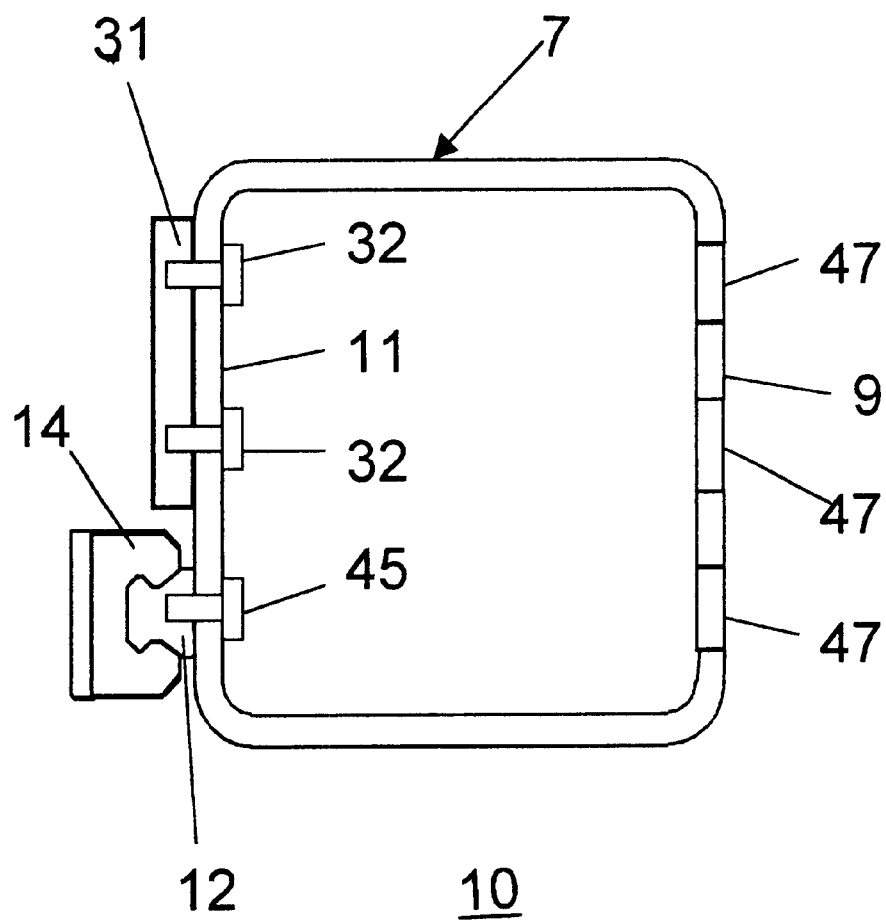
FIG. 11 is a partial horizontal section through the x skid.

As shown in FIG. 10, the screws may also be screwed from the inside of a skid into the part to be mounted. FIG. 11 shows that the permanent magnet arrangement 31 of the y linear motor 30 may also be attached on the x skid 7 by means of screws 32 in such a way that the screws 32 are screwed from inside the hollow-case-shaped x skid 7 through the face side 11 of the x skid 7 into the permanent magnet arrangement 31. This is possible because openings 47 that are flush with the screws 32 are formed in the rear side 9 of the x skid 7, through which the screws 32 can be inserted and through which a tool for fastening or loosening the screws 32 can be passed. In the same manner, the y guide rails 12 may be mounted on the face side 11 of the x skid 7 by means of screws 45. This way of mounting applies likewise to the mounting of the stator coils 27 and the guide shoes 8 on the rear side 9 of the x skid 7 as shown in FIG. 10.

It is clear from the aforesaid that the front side 5, the rear side 9, and the face side 11 of the x skid 7 and the rear side 15 of the y skid 13 provide easily workable and accessible assembling surfaces for the x and y guides and the x and y linear motors 23, 30.

It is further clear from the aforesaid that the linear motors 23, 30 each consist of a first motor element and a second motor element. Likewise, the x guides and y guides each comprise a first guide element and a second guide element. All the elements are assigned to each other in pairs and mounted so as to face each other, respectively.

What is claimed is:

1. A machine tool comprising:
    a rack (2) defining an inner space (3), and
        comprising a front side (5) positioned in an x-y plane;
    an x skid (7) and a y skid (13), the x skid (7) having
        a rear side (9) facing the front side (5), and
        a face side (11) turned away from the rear side (9) and assigned to an operating side (4);
    x guides (6, 8) mounted
        on the rack (2) on the one hand, and
        on the x skid (7) on the other, and
        allowing a displacement of the x skid (7) relative to the rack (2) in an x direction;
    y guides (12, 14) mounted
        on the x skid (7) on the one hand, and
        on the y skid (13) on the other, and
        allowing a displacement of the y skid (13) relative to the x skid (7) in a y direction;
    a tool spindle (20) arranged in the y skid (13) and extending in a z direction (3);
    x linear motors (23)
        arranged on the front side (5) of the rack (2) on the one hand and on the rear side (9) of the x skid (7) on the other,
        each comprising a primary part (27) and a secondary part (24), and
        each comprising an air gap (37) between the primary part (27) and the secondary part (24),
            wherein the air gaps (37) of the x linear motors are arranged in a common x-y plane; and
    y linear motors (30) arranged mirror-symmetrically relative to a central y-z plane (22) of the x skid (7) and further
        arranged on the face side (11) of the x skid (7) on the one hand and on the rear side (15) of the y skid (13) on the other,
        each comprising a primary part (34) and a secondary part (31), and
        each comprising an air gap (38) between the primary part (34) and the secondary part (31),
            wherein the air gaps (38) of the y linear motors (30) are arranged in a common x-y plane.

2. A machine tool according to claim 1, wherein the x guides (6, 8) are attached to the front side (5) of the rack (2) on the one hand and to the rear side (9) of the x skid (7) on the other.

3. A machine tool according to claim 2, wherein the x guides (6, 8) are mounted on the rack (2) and the x skid (7), respectively, by screws (41, 43) that extend in z direction.

4. A machine tool according to claim 1, wherein a first part (24) of each x linear motor (23) is arranged on the front side (5) of the rack (2) and a second part (27) is arranged on the rear side (9) of the x skid (7).

5. A machine tool according to claim 4, wherein the x linear motors (23) are mounted on the rack (2) and the x skid (7), respectively, by screws (25, 28) that extend in z direction.

6. A machine tool according to claim 1, wherein the y guides (12, 14) are attached to the face side (11) of the x skid (7) on the one hand and to the rear side (15) of the y skid (13) on the other.

7. A machine tool according to claim 6, wherein the y guides (12, 14) are mounted on the x skid (7) and the y skid (13), respectively, by screws (45, 47) that extend in z direction.

8. A machine tool according to claim 1, wherein a first part (31) of each y linear motor (30) is arranged on the face side (11) of the x skid (7) and a second part (34) is arranged on the rear side (15) of the y skid (13).

9. A machine tool according to claim 8, wherein the y linear motors (30) are mounted on the x skid (7) and the y skid (13), respectively, by screws (32, 35) that extend in z direction.

10. A machine tool according to claim 1, wherein the x linear motors (23) are arranged mirror-symmetrically relative to a central x-z plane (21) of the rack (2).

11. A machine tool according to claim 1, wherein the guides (6, 8; 12, 14) and the linear motors (23, 30) are at least in part openly exposed towards the operating side (4).

* * * * *